United States Patent [19]

McKinney

[11] Patent Number: 4,459,171
[45] Date of Patent: Jul. 10, 1984

[54] MANDREL FOR FORMING A COMPOSITE PANEL OF VARIED THICKNESS

[75] Inventor: Maurice E. McKinney, Bellevue, Wash.

[73] Assignee: The Boeing Company, Seattle, Wash.

[21] Appl. No.: 405,697

[22] Filed: Aug. 5, 1982

Related U.S. Application Data

[62] Division of Ser. No. 306,340, Sep. 28, 1981, Pat. No. 4,401,495.

[51] Int. Cl.$^3$ ............................................. B65H 81/00
[52] U.S. Cl. ..................................... 156/425; 156/174; 156/426
[58] Field of Search ............... 156/425, 426, 174, 173, 156/175, 172, 169, 193, 195, 171, 189; 249/175, 184, 185, 186; 242/7.21, 7.22, 7.23, 7.02; 428/172, 105, 107, 109, 110, 113, 114, 157, 158, 160, 161, 156

[56] References Cited

U.S. PATENT DOCUMENTS

| | | |
|---|---|---|
| 2,454,074 | 11/1948 | Marc . |
| 2,980,158 | 4/1961 | Meyer . |
| 2,987,100 | 6/1961 | Strickland et al. ................. 156/175 |
| 3,082,141 | 3/1963 | Steele et al. . |
| 3,142,598 | 7/1964 | Rosen . |
| 3,189,501 | 6/1965 | White . |
| 3,205,108 | 9/1965 | Wilkens . |
| 3,333,279 | 7/1967 | Colen et al. . |
| 3,345,233 | 10/1967 | Wilkens . |
| 3,367,815 | 2/1968 | Rasettli et al. ....................... 156/175 |
| 3,448,253 | 6/1969 | Bramblett et al. ................... 156/173 |
| 3,645,829 | 2/1972 | Palfreyman et al. . |
| 4,089,727 | 5/1978 | McLain .............................. 156/173 |
| 4,172,175 | 10/1979 | Pearson et al. ...................... 156/180 |
| 4,221,623 | 9/1980 | Heissler et al. ...................... 156/174 |

Primary Examiner—Michael W. Ball
Attorney, Agent, or Firm—Delbert J. Barnard; Eugene O. Heberer

[57] ABSTRACT

A varied thickness laminate or panel (92, 128) is fabricated by polar winding incomplete lamina or plies (54, 146, 148) on a mandrel (10, 110, 130) at selected angles. The plies (54) are wound at crossing angles, first one layer (60) at one angle and then a second layer (64) at a second angle. At the most remote crossing point from a wide starting end (32), a V (66) is formed between the crossing plies (60, 64) and in the space (62) formed by the V (66), no plies extend on the mandrel side (30). Thus, the winding on each side (30) is incomplete, a space (62) between successive V's (66, 154, 164, 174) being skipped by steps of the crossing plies. The first V (66) starts a taper from wide starting end (32) to narrow other end (34). Successive plies are wound around the mandrel from the polar ends (48, 50, 134), each successive set forming a V so as to thicken the windings in steps formed by the V's. The mandrel (10, 110) preferably has an even number of sides (30) to provide an outside shape that approximates a cylinder. The wide and narrow ends (32, 34) are reversed circumferentially around the mandrel. The polar skip winding of filaments or tapes (54) makes possible the development of tapered cantilevered structural parts (92, 128) having a high strength-to-weight ratio.

6 Claims, 19 Drawing Figures

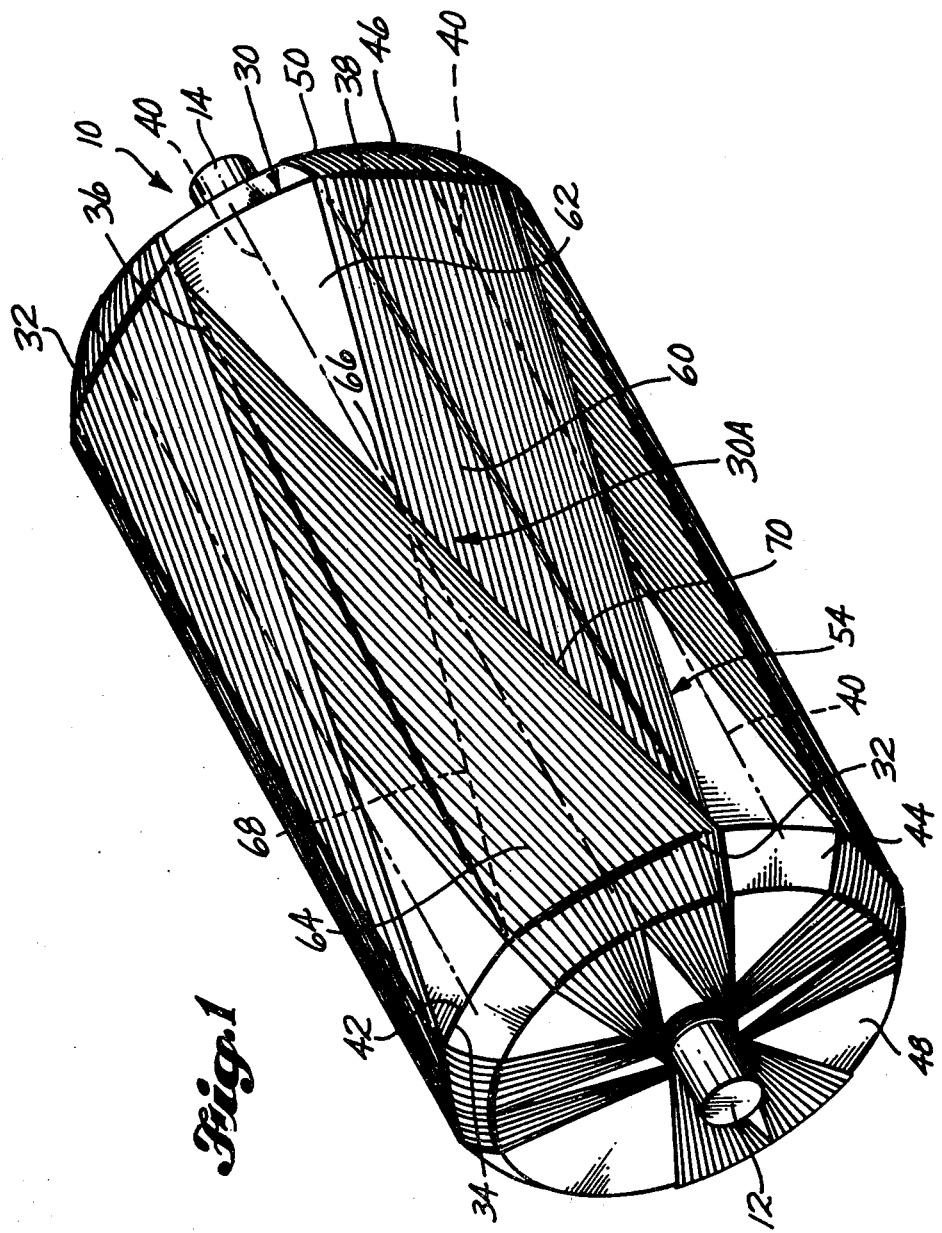

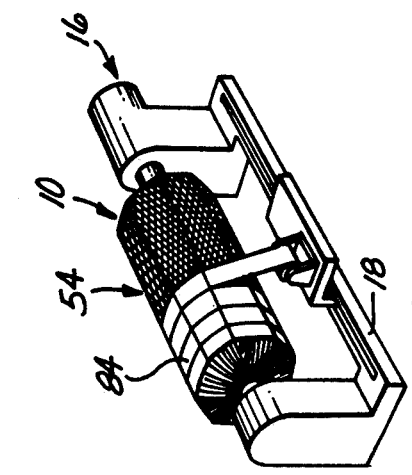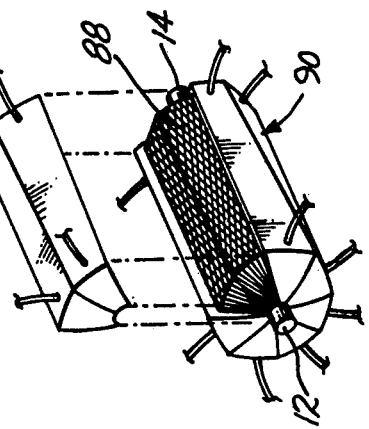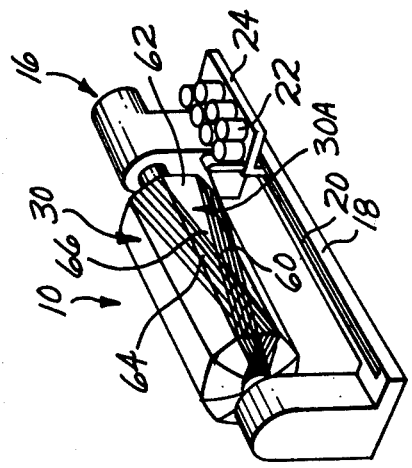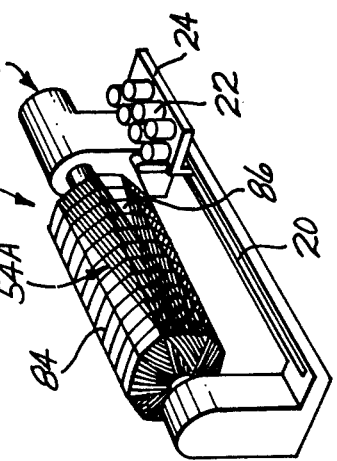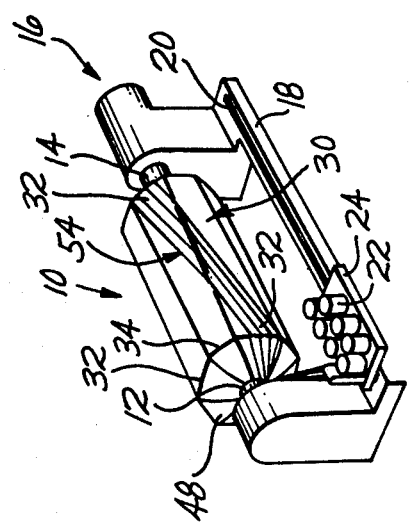

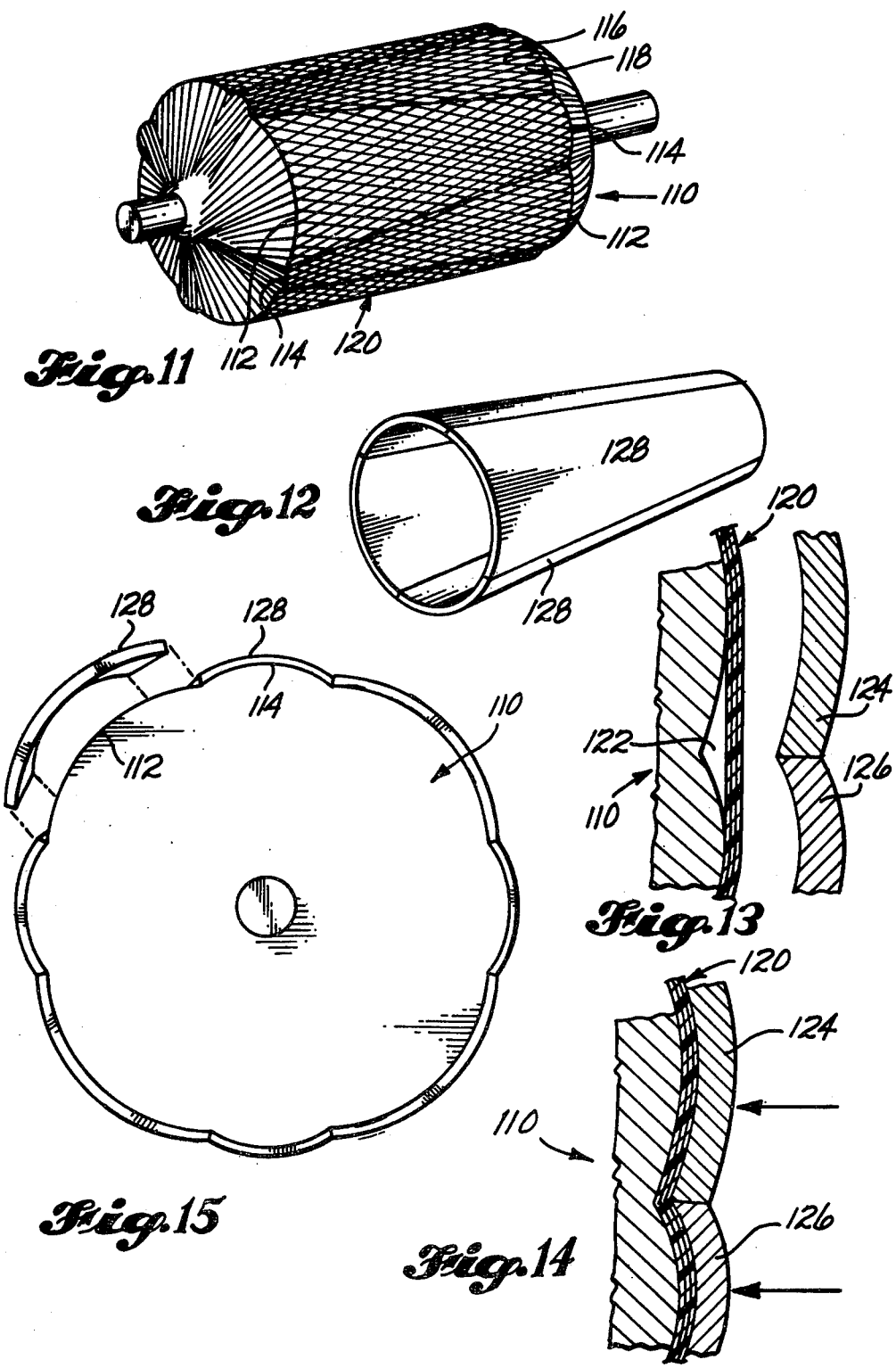

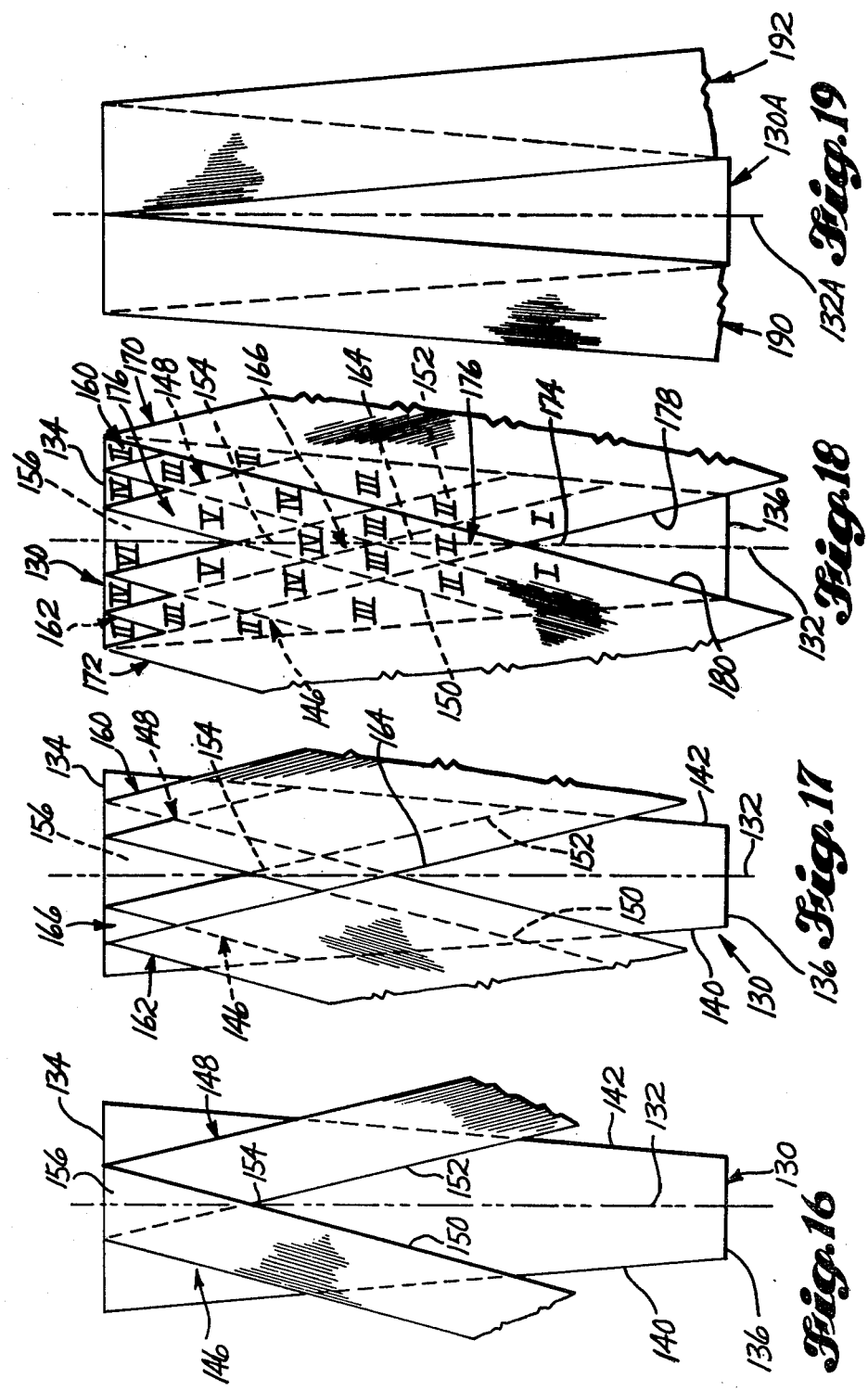

MANDREL FOR FORMING A COMPOSITE PANEL OF VARIED THICKNESS

This is a division of application Ser. No. 06/306,340, filed Sept. 28, 1981 now U.S. Pat. No. 4,401,495.

DESCRIPTION

1. Technical Field

The invention relates to specific composite panel structures having varied thicknesses and to a method for making the same. The composite panels are particularly adapted for use in the construction of composite aircraft. The various composite parts include cantilevered parts of aircraft, such as wings and stabilizers which typically required varied and/or tapered skin panel thicknesses for minimum weight structure.

Composites are combinations of materials differing in composition or form. The constituents retain their identities in the composite; that is, they do not dissolve or otherwise merge completely into each other, although they act together. Normally, the components can be physically identified.

2. Background Art

Cantilevered structural parts or aircraft such as wings and stabilizers require varying panel thicknesses for minimum weight structure. To make such parts out of advanced composite structures requires automated fabrication to reduce manufacturing cost. Prior attempts to solve this problem have provided an automated tape layup system and modifications of a filament winding system which require hand working of each tapered arrangement of unidirectional fibers or filament in a matrix. The hand working makes such a system economically unfeasible.

A patent search was made relative to the concept of fabricating varied thickness composite laminates, the concept being one that could be automated to wind filaments on a mandrel. The patents found disclose the winding of a master structure and thereafter severing the same so as to secure several individual component end products. However, the search did not find any patents that disclose the winding of filaments on a mandrel so that the thickness of panels being formed could be varied to suit structural requirements of minimum weight. For example, U.S. Pat. No. 3,645,829 illustrates an apparatus including a number of airfoil section formers or molds mounted on a rotatable drum for winding a continuous fiber onto the formers.

U.S. Pat. No. 3,142,598 discloses a process employing unidirectional fiberglass roving under tension and which is wound unidirectionally to the proper form to eliminate manufactured compressive and tensile stresses in the finished product.

U.S. Pat. No. 3,189,501 discloses a method of producing unexpanded structural honeycomb material by winding sheet material upon a rotary former, and applying to the sheet material, during the winding operation, an adhesive which is distributed in bands positioned such that the material accumulated on the former is, when sliced, expandable to the cellular state. The following U.S. Pat. Nos. disclose systems similar to those described above: 2,454,074, 2,980,158, 3,082,141, 3,205,108, 3,345,233, 3,333,279

DISCLOSURE OF THE INVENTION

The invention is comprised of a rotatable mandrel, composite laminated products of varied thicknesses, and a method of making such products on the mandrel. The invention provides a system which can be automated for low cost production of cantilevered structural parts of aircraft such as wings, fuselage panels, and stabilizers having a high strength-to-weight ratio.

According to the invention, a varied thickness laminate or panel is fabricated by polar winding incomplete lamina or plies on the mandrel at selected polar winding angles, determined by the geometry of the panel. That is, polar windings are wound around the ends of the rotatable mandrel and are started at one end of a mandrel side at selected angles with respect to the axis of the mandrel and a side center line in the same plane. The lamina or plies are wound at crossing angles, first one layer at one angle and then a second layer at a crossing angle. The plies cross relatively remotely from the end where the windings start on the side. At the most remote crossing point, a V is formed between the crossing plies, and in the space formed by the V, none of the crossing plies extend between the V-legs on the mandrel side. That is, the winding on each side is incomplete, the space between the V being skipped by each step of crossing plies. The plies are impregnated with an uncured resin. The first V starts the taper toward the other end and has its apex generally on the center line.

Successive plies are wound around the mandrel from the polar ends, each successive set normally forms a V more remote from the starting end so as to thicken the windings on the side and to form a thinner portion of windings between the legs of each of the successive V's. The V's thus form thickening steps toward the starting end with the taper extending from the starting end to the other end. The location of these steps on each side is determined by the ratio of the composite mandrel width to the space width in each incomplete polar lamina. The steps and V's are not necessarily developed in a specific order with respect to the remote end.

For structural purposes, the thickness of each panel made on a side in the diametrical direction of the mandrel can be changed by using different polar winding angles within the constraints of the panel geometry.

The mandrel is made to be generally cylindrical and preferably has an even number of sides to provide an outside shape that approximates a cylinder. The sides of the mandrel are juxtaposed, having a wide end, from which the polar winding is started, ,nd a narrow end adjacent where the first V is normally formed. The wide and narrow ends are reversed, alternately circumferentially around the mandrel.

This arrangement allows any number of complete lamina or ply windings such as at 90 degrees, plus or minus 45 degrees to the mandrel axis, and also complete polar windings in addition to any number of partially wound, incomplete lamina or plies. These various windings are made as required to obtain the prerequisite varied thicknesses of the panels. Winding systems using filaments or tapes are impregnated with a resin matrix which is cured as a part of the fabrication process of the composite panels.

The polar skip winding of filaments or tapes, according to the invention, makes possible the economical development of tapered cantilevered structural parts of an aircraft having a high strength-to-weight ratio. The concept of skip winding to make the aforesaid varied thickness composite laminates is particularly adaptable for automated fabrication for greatly reducing the manufacturing cost which heretofore has been economically prohibitive.

In the polar winding of laimina or plies, the filaments or tapes are wound so that the filaments travel a complete cycle, down and back the length of the mandrel, while the mandrel makes one complete revolution.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is an isometric view of a mandrel according to the invention, illustrating the polar winding of one set of V-forming filaments on each side of the mandrel;

FIG. 2 is a substantially isometric view illustrating the start of a polar winding of filaments from the wide end of one side of the mandrel to the wide end of a contiguous side of the mandrel;

FIG. 3 is a view similar to FIG. 2 illustrating one set of windings on one side of the mandrel and the formation of a V-shaped omission in a completed winding;

FIG. 4 is a view of the mandrel being wrapped at 90 degrees to the axis with an impregnated core-forming tape after a first layer of polar windings have been completed;

FIG. 5 is a view illustrating the completion of the 90 degree tape winding on the mandrel;

FIG. 6 is a view of the completion on one side of the mandrel of one set of polar windings of a second layer being formed on the 90 degree core winding;

FIG. 7 is a view illustrating a completed polar wound shell on a mandrel being enclosed by a caul in which the impregnating resins are cured;

FIG. 11 is an isometric view of a mandrel having a surface of constant circumferential lengths and adapted to make conical fuselage-forming panels according to the invention;

FIG. 12 is a view of an assembly of tapered panels made from the mandrel in FIG. 12;

FIG. 13 is a fragmentary cross-sectional end view illustrating the bridging effect of the formation of panels on the mandrel in FIG. 12;

FIG. 14 is a view similar to FIG. 13 in which the bridging effect is removed during the curing operation in a mold;

FIG. 15 is an end view of the mandrel in FIG. 12 illustrating the completed panels;

FIG. 16 is a plan view of a side of a mandrel as shown in FIG. 1, illustrating an alternate filament skip winding procedure;

FIG. 17 is a view similar to FIG. 16 having an additional layer set of polar wound filaments;

FIG. 18 is a view similar to FIGS. 16 and 17 having a third set of taper forming filaments wound thereon; and FIG. 19 is a plan view of a side of a mandrel as shown in FIG. 1, illustrating a polar skip winding arrangement for starting with a long central bare surface.

BEST MODE FOR CARRYING OUT THE INVENTION

Figure 8:
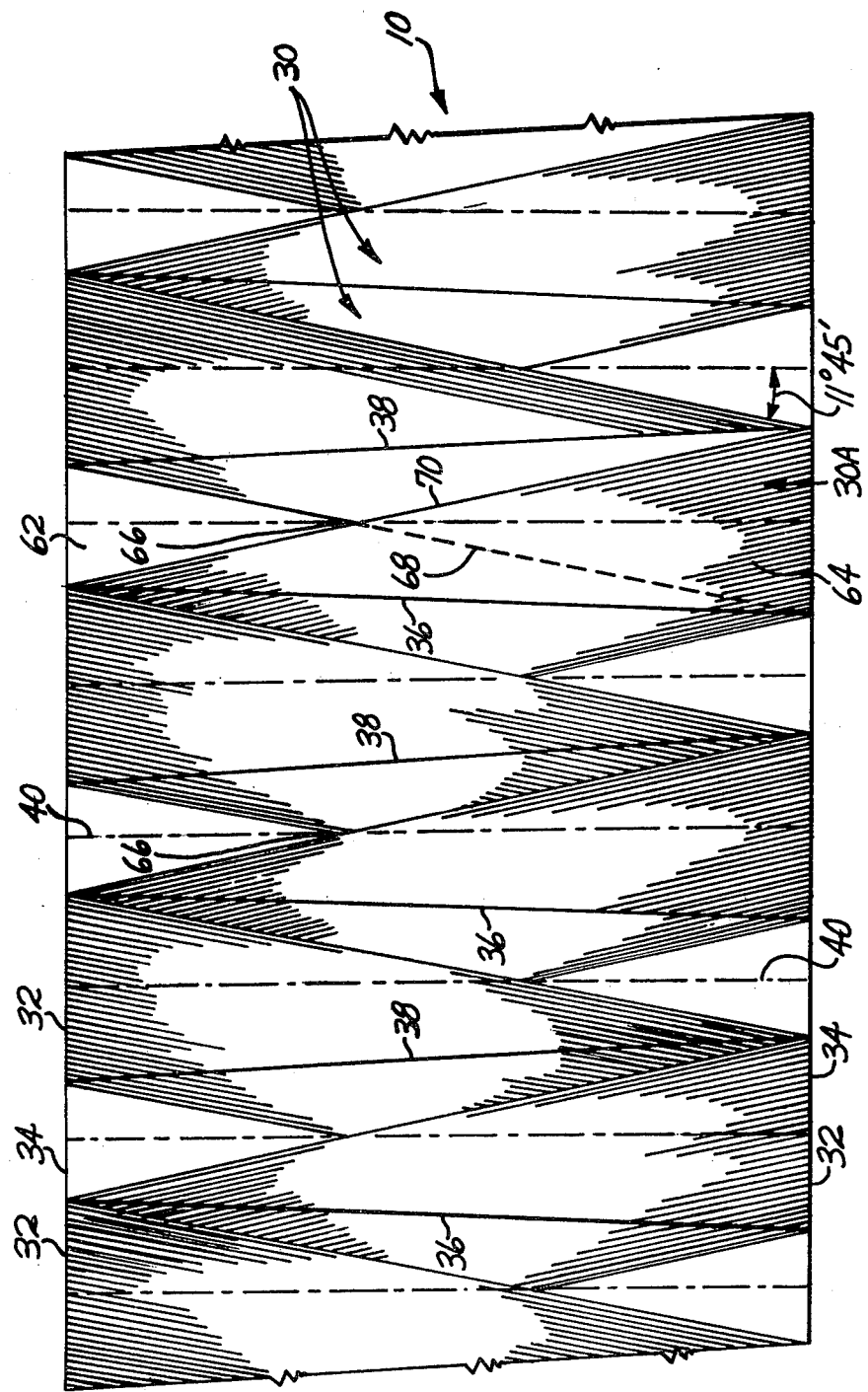
FIG. 8 is the layout of the development of a mandrel having one set of polar wound filaments thereon and illustrating the skip winding concept on each mandrel side at its narrow end.

Referring again to the drawings, there is shown in FIGS. 1-7 a generally cylindrical mandrel, designated as 10 The mandrel has polar shafts 12 and 14 at opposite ends on which it is supported for rotation in a motor driven, automated filament or tape winding machine 16. Such machines can wind mandrels from 6" long and 1" in diameter to 12' in diameter and 40' long. The machines are operated by a computer, and once the initial operating parameters are programmed into a microprocessor, the actual winding process is automatic and requires minimal work to be performed by an operator.

The machine 16 has a base 18 in which there is an elongated slot 20 having spool support 24 therein to carry a muliple number of spools 22 on which continuous, resin impregnated filament or tape is wound to be wound automatically on the surfaces of the mandrel 10. During the winding process, the filaments are wound from one end of the mandrel to the other. The spool support 24, slidable in the slot 20, is automatically moved from one end of the mandrel to the other, as indicated in FIGS. 2 and 3.

The mandrel preferably should have a sufficient even number of identical sides or panels, two or more, to provide an exterior that approximates a cylinder. In FIG. 1, the mandrel 10 has eight identical sides, generally designated as 30. Each panel has a wide end 32, and a narrow end 34, with edges 36 and 38. The sides are juxtaposed but alternately reversed so that a wide end is contiguous with a narrow end around the circumference of the mandrel. The edges 36 and 38 are generally straight but not parallel, positioned so that a plane through center line 40 in each side 30 extends through the axis of the mandrel and shafts. Each side 30 is slightly bowed in cross section as indicated by the end lines 42 forming a peripheral edge around the mandrel. The surfaces of the sides may be of various configurations depending upon the shape of the panels to be manufactured thereon.

At the end of the sides there are peripheral edge surfaces 44 and 46, the surfaces being axially curved so that impregnated fibers, tapes or filaments tighten thereon as they are polar wound. End portions 48 and 50 are generally flat to receive the polar windings transversely. In FIGS. 2-7 the peripheral edges 44 and 46 are not shown in detail.

In FIG. 2 the polar winding of fibers 54 are in a first stage of winding at a predetermined angle with respect to the axis or center line 40 of the side 30 and are being wound from a wide end 32 of a first side panel to a wide end 32 of the contiguous side. As best seen in FIG. 1, the polar windings extend over the ends of the mandrel starting at a wide end of a side and continuing at a predetermined angle onto the next panel and then over the end returning in a peripherally spaced but not necessarily opposite side as suggested in FIG. 1. The location of the returning fibers depends upon the angle with respect to the axis or center line 40, the configuration of the mandrel, and the computer programming.

The fibers may be in the form of very fine filaments having diameters measured in thousands of an inch, may be in the form of strands of roving, or be in tape or belt form. The fibers are impregnated or preimpregnated in the process in conventional manners with conventional uncured thermosetting resins. They may be of the wet, hot melt, or prepreg fiber types and conditions. A wet Ciba Geigy XU-205/235 resin system has been used for considerable filament winding development.

The use of preimpregnated rovings is an alternative to wet winding and eliminates mechanical fiber impregnation prior to application to the mandrel tool surface. A qualified resin type with specific resin content can be used to impregnate the designated fiber type. Prepreg reduces both setup and cleanup time requirements. However, the use of preimpregnated rovings requires the development of a special delivery system that will preheat and spread the rovings to produce a slight resin flow and correct bandwidth.

Development work has also been done in the use of prepreg tape windings which are generally limited to shapes with straight line paths.

Other resins used are Shell Epon 828, Narmco 5208, Hercules 3501, and Fiberite 934. Graphite, glass, and boron have been used as fibers. The graphites used could be such as those described commercially as Hercules AS, Celion 3,000, or Union Carbide T300.

The filaments used are fibers that are characterized by extreme length so that there are normally no filament ends within a part except at geometric discontinuities.

A polar wound lamina or ply, as illustrated in FIG. 1, is wound at an angle, in this case 11 degrees and 45 minutes, with the axis or center line of the sides 30, so that the filament travels a complete cycle, down and back the length of the mandrel and over the ends while the mandrel makes one complete revolution. One set of such a polar wound ply has been wound on each of the sides 30 in FIG. 1. For example, in the side having plies designated 30A in FIGS. 1 and 3, the first winding of filaments 60 starts at the polar end 48 of the mandrel and is wound to cover a substantial part of the side leaving a skipped or blank space 62 adjacent the narrow end 34. The set is completed by a second winding 64 at the same angle but in a crossing direction, also starting at the wide end 32 across its entire width, and forms a V 66 having its apex approximately on the center line 40, the space 62 between the legs of the V being generally allochirally arranged.

In FIG. 1, between the broken line 68 and the line 70, fibers have been doubled on the side so as to start the thickening of the plies from the wide end. The remainder of the windings on the side are singular and the portion between legs of the V 66, having no winding, makes the set of plies an incomplete winding with respect to the side. This is repeated on each side adjacent the narrow end. In FIG. 8 there is shown a plan view development of the mandrel sides 30 in which the first sets of windings, as 30A are formed. It also illustrates perimeters of the finished panels, each having the boundary configurations of the plan view of sides 30.

According to the structure required, the angle with the center line 40 formed with the individual filaments may have to be changed as the thickening progresses. Such changes in the angles of winding the plies are incorporated in the computer program. In addition, plies may be wound on the individual sides to cover the area between the V 66 which provides a bare space on the mandrel. Such a covering would not change the taper if applied uniformly but would merely provide a surface on the mandrel side.

For example, in FIG. 4, a completed shell of filaments 54 has been formed on the mandrel and the mandrel is being wound with a tape 84 at 90 degrees to the axis. Here, a series of V's have been covered by crossing windings to complete the first layer of a panel formed on each of the sides 30. The tape 84, provides a core for thickening the individual panels and may be formed of the various materials indicated above. The tape could be made of graphite fibers impregnated with one of the uncured resins which had been mixed with hollow carbon microspheres, for example. Such microspheres have diameters in the range of 5 to 150 microns and are typically hollow. The winding of the tape 84 does not change the tapers on the individual sides 30 but merely continues the taper from the wide ends toward the narrow ends and thickens the structure of the panel being formed.

In FIG. 5, the winding of the tape 84 has been completed and a core has been formed on the panels being created on the mandrel.

In FIG. 6, a second tapered layer of sets of plies is being polar wound on the mandrel so as to cover the core and make an outer tapered skin. Here, the filaments are designated, as 54A, and are the same as the filaments 54 and are wound in the same manner and impregnated with the same or equivalent resins. If the same pattern of winding filaments 54 is applied in winding the filaments 54A, then the taper of the finished panel will be increased.

As shown in FIG. 6, the skip winding technique is applied in the same manner to leave a space 86 between the V of the filaments and is the first of a series of V's to be formed to complete the panel structure on each of the sides.

In FIG. 7, additional filaments 88 have been applied to completely cover the taper-forming windings but without changing the taper. At this stage, the resins on the various layers are uncured and the structure is relatively soft regardless of the type of resins used. Because of softness, the panels being formed can be shaped, within limits, by the application of a female mold 90 being applied to the shell formed on the mandrel, and provide finishing desired as the resins are cured by the applications of pressure and temperature. Usually the resins are cured between 250 and 350 degrees F. When the resins are cured, the female mold is removed and the shell is cut from the mandrel along the lines 36 and 38, shown in FIGS. 1 and 8, which are the edges of the sides of the mandrel. Thicknesses of the windings on the mandrel do not obscure the edges to be cut.

Figure 10:
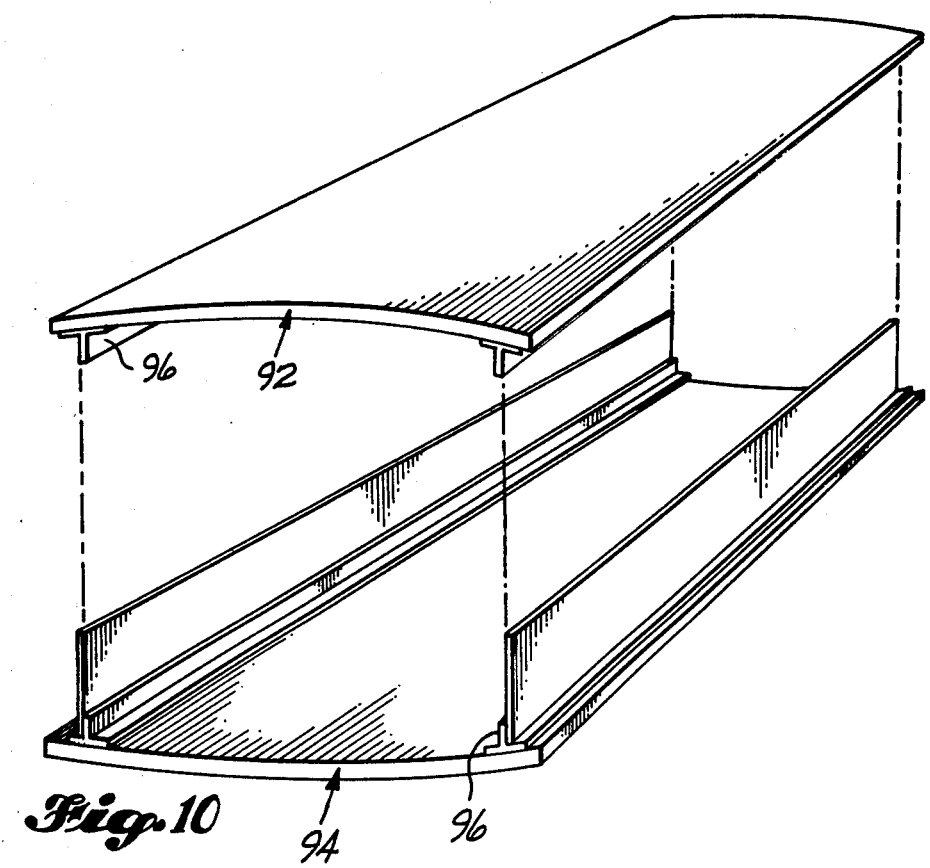
FIG. 10 is an exploded view of two tapered panels made according to the invention and having stringers attached.

In FIG. 10 there are two panels 92 and 94 made according to the foregoing process and cut from, a shell as shown in FIG. 7. Here the tapered panels 92 and 94 are adapted to form portions of a wing structure, for example, where the cantilevered parts of an aircraft require a varied skin panel thickness for minimum weight structure.

Each of the wings has stiffening T-shaped stringers 96 formed integrally therewith and which may be made of a graphite reinforced resin. Such stringers can be formed in the mandrel along with the panels.

Figure 9:
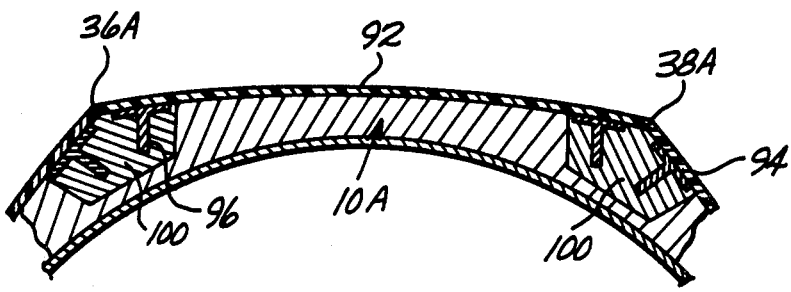
FIG. 9 is a fragmentary cross-sectional view of a mandrel illustrating the formation of a panel thereon and the insertion of stringers adapted to be secured to the panel during the curing process.

As shown in FIG. 9, a mandrel 10A, of the same general construction as the mandrel 10, has longitudinal axially directed inserts 100 positioned along the side edges, as 36A and 38A, which are the equivalent of 36 and 38 in FIG. 1. The inserts 100 have mold configurations to form the T-shaped stringers 96 when a reinforced resin is inserted therein, and when the shell on the mandrel is cured, the stringers are also cured and made integral with the panels as 92 and 94, for example.

In FIGS. 11 and 15, a generally cylindrical mandrel 110 is shown, similar to the mandrel 10 in FIG. 1. The mandrel is made to have constant length circumferential surfaces, interrupted by segments, forming curved sides, so as to not form a true cylindrical surface. The segments are alternated, having a wide portion 112 at one end and a narrow portion 114 at the other end so that generally conical-shaped, fuselage-type panels can be formed thereon. Crossing windings 116 and 118 are polar wound in the same manner as the windings on the mandrel 10, each set of windings being incomplete (not shown) so as to skip a portion of the mandrel for each panel 12D adjacent the narrow end. The tapers are formed in the same stepped way as in the panels formed on the mandrel 10.

During the winding, FIGS. 13 and 14, bridging occurs in the panel formation, as at 122, where the uncured impregnated filaments do not follow the lines joining the wide and narrow segments of the mandrel surface. This bridging is rectified by the application of cauls 124 and 126 or other type of molding apparatus which is applied to the wound filaments. As shown in FIG. 14, pressure is applied in the direction of the arrows and the uncured resin is forced to adopt the configuration of the mandrel and the complementary configuration of the cauls. The resins are cured in the configuration shown in FIG. 14 and after curing the individual panels, all being identical, as 128, are cut from the mandrel as shown in FIG. 15. The panels are then joined together by splicing or other mechanical means to form a generally conical-shaped tubular member, for use as a fuselage portion of an aircraft, for example. In such structures, again the parts, where cantilevered, require the taper for minimum weight structure.

In FIGS. 16-18, a mandrel side 130, comparable to the mandrel sides 30 in FIG. 1, is shown apart from the mandrel to illustrate alternative arrangements of polar winding of impregnated filaments in the same manner they would be wound on the entire mandrel. The side has a center line 132 in the plane of the mandrel axis and has wide and narrow ends 134 and 136, respectively. Side edges 140 and 142 are common to respective contiguous reversed sides of the mandrel.

The skip polar winding of all of the filaments starts at the wide end 134 and extends approximately at about a 15 degree angle to the center line 132. In FIG. 16, the crossing layers of filaments, generally designated as 146 and 148, shown generally as tape for simplicity, extend from the polar end over the wide end of the side and continue beyond the edges 142 and 144 onto contiguous sides toward their wide ends. The crossing edges 150 and 152 of the filaments form a V 154 and above the V, a thickened double layer 156 is formed. In FIGS. 17 and 18 the parts of the filaments 146 and 148 are shown in phantom outline.

In FIG. 17 a second set of polar wound filaments, generally designated as 160 and 162, extend from over the wide end 134, form a crossing V 164, and form a double layer of the filaments 160 and 162, designated as 166, above the V. The filaments 160 and 162 extend in their crossing directions off of the side 130 and over the edges 140 and 142 onto the contiguous sides, toward their wide edges.

In FIG. 18 the edges of the filaments 146, 148 and 160, 162 are shown in phantom outline. A third set of filaments 170 and 172 are polar wound over the end 134 onto the side 130 and form a V 174 where they cross. Above the V 174, the filaments form a double layer 176. The filaments extend across the entire length of the wide edge and over the entire length of the sides 140 and 142 onto the entire wide ends of the contiguous sides. The crossing lines forming the V 174 are 178 and 180 and each extend from a respective corner of the wide end 134 to an opposite corner of the narrow end 136.

In the six layers of windings polar wound on the side 130, a stepped taper is formed from the wide end toward the narrow end. The taper is not perfect but can be improved by additional windings, and also in a mold when the resins are being cured. As may be seen in FIG. 18, with the aid of FIGS. 16 and 17, the triangular area 156 at the top center of the wide end, marked VI, in FIG. 18 contains all six layers of the material. The areas immediately laterally outwardly thereof, marked V, have five layers, there being only one layer of the filaments 146 and 148. In the V 154, marked IV, there are four layers, the layers 146 and 148 being omitted.

In the upper triangular areas along the wide edge 134, formed by the layers 160, 170 and by layers 162 and 172, there are four layers marked IV. In the outer corners along the wide end, there are only two layers, II, formed by the upper two layers wound. Immediately inwardly and below, in the four sided figures, there are three layers, III. In the areas interally thereof on the outer edges, there is only one layer, I, and immediately below that on the outer edges, there are two layers, marked II. Downwardly therefrom along the edges is a larger area having, three layers, III, and inwardly thereof another quadrangle has four layers, IV. In the areas just above and outwardly of the V 164, there are three layers, III. In the V 164, there are two layers, II, and immediately laterally thereof there are also two layers, II. Just outwardly of the V 174, there are two areas having one layer, I, and the V has no layer. Thus, the tapering effect can be clearly seen both longitudinally and laterally.

In FIG. 19 the start of another winding arrangement is illustrated on a side 130A, identical with the side 130. In this arrangement two sets of filaments 190 and 192 are polar wound from the wide end toward the narrow end, the windings separating at the center line 132A at an angle of about 4 or 5 degrees therewith. This winding provides a complete single layer along each edge and a substantially bare center portion widening toward the thinner end. Subsequent windings can be added at various angles crossing the bare portion to build it up starting at the wide end and maintaining thinness toward the narrow end. This type of a start makes possible an easier tapering arrangement along the edges.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

I claim:

1. For use in forming composite layered parts, a mandrel comprising:
   a multiple number of substantially equivalent peripheral panels;
   the panels being juxtaposed and reversed to have wide and narrow axially spaced ends alternately arranged peripherally around the mandrel.
2. The invention according to claim 1 in which:
   said panels are of even number and substantially identical.
3. The invention according to claim 2 in which:
   said mandrel is substantially cylindrical.
4. The invention according to claim 1 including:
   a shaft extending from each end of the mandrel on which the mandrel is adapted to be rotated.
5. The invention according to claim 4 including:
   generally transverse end portions extending generally radially from the shaft to the panels at each end of the mandrel to receive polar windings of material wound on the mandrel from one end to the other end and returned the length of the mandrel.
6. The invention according to claim 3 in which:
   said mandrel has circumferential distances that are constant along the length of the panels.

* * * * *

UNITED STATES PATENT AND TRADEMARK OFFICE
CERTIFICATE OF CORRECTION

PATENT NO. : 4,459,171
DATED : July 10, 1984
INVENTOR(S) : Maurice E. McKinney It is certified that error appears in the above-identified patent and that said Letters Patent are hereby corrected as shown below:

Column 2, line 34, "mandrel" should be --material--.

Column 2, line 46, ",nd" should be --and--.

Column 7, line 17, "12D" should be --120--.

Column 8, line 31, "interally" should be --laterally--.

Signed and Sealed this

Sixteenth Day of April 1985

[SEAL]

Attest:

DONALD J. QUIGG

*Attesting Officer*  *Acting Commissioner of Patents and Trademarks*